(12) United States Patent
Hashimoto

(10) Patent No.: US 7,528,898 B2
(45) Date of Patent: May 5, 2009

(54) LIQUID CRYSTAL DISPLAY APPARATUS

(75) Inventor: Yoshinari Hashimoto, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 478 days.

(21) Appl. No.: 11/201,218

(22) Filed: Aug. 11, 2005

(65) Prior Publication Data

US 2006/0038933 A1    Feb. 23, 2006

(30) Foreign Application Priority Data

Aug. 20, 2004  (JP) .............................. 2004-240785

(51) Int. Cl.
*G02F 1/1333*  (2006.01)
(52) U.S. Cl. ...................................... 349/58
(58) Field of Classification Search ................... 349/58
See application file for complete search history.

(56) References Cited

U.S. PATENT DOCUMENTS

| | | | | |
|---|---|---|---|---|
| 5,313,318 A * | 5/1994 | Gruenberg et al. | ............ | 349/65 |
| 2001/0019377 A1* | 9/2001 | Fukayama et al. | ............ | 349/58 |
| 2001/0035923 A1* | 11/2001 | Cha et al. | .................... | 349/65 |
| 2002/0063812 A1* | 5/2002 | Natsuyama | ................. | 349/58 |

FOREIGN PATENT DOCUMENTS

| JP | 07-160423 | 6/1995 |
|---|---|---|
| JP | 2001-83887 | 3/2001 |

OTHER PUBLICATIONS

English machine translation of: Tei Inkan (JP 2001-021869).*

* cited by examiner

*Primary Examiner*—David Nelms
*Assistant Examiner*—Lucy P Chien
(74) *Attorney, Agent, or Firm*—Oblon, Spivak, McClelland, Maier & Neustadt, P.C.

(57) ABSTRACT

A liquid crystal display apparatus includes a backlight unit including a light guiding plate that includes a light emitting surface, a light source and a back cover that covers the light guiding plate and the light source and has an opening in a region thereof that faces the light emitting surface, a liquid crystal display panel including an array substrate provided to face the light emitting surface, a counter substrate and a liquid crystal layer, a frame-shaped case that covers a peripheral portion of the counter substrate and peripheral walls of the back cover, and an input device provided on the case to face the counter substrate and having an entry surface, wherein the back cover includes a plurality of projecting portions which project even the light emitting surface, face a side edge of the liquid crystal display panel, and support the input device via the case.

4 Claims, 3 Drawing Sheets

LIQUID CRYSTAL DISPLAY APPARATUS

CROSS-REFERENCE TO RELATED APPLICATIONS

This application is based upon and claims the benefit of priority from prior Japanese Patent Application No. 2004-240785, filed Aug. 20, 2004, the entire contents of which are incorporated herein by reference.

BACKGROUND OF THE INVENTION

1. Field of the Invention

The present invention relates to a liquid crystal display apparatus, and more specifically to a liquid crystal display apparatus equipped with an input device.

2. Description of the Related Art

In recent years, liquid crystal display apparatus are used in car navigation systems or the like, and such liquid crystal display apparatus are required to be equipped with a data entry function, and therefore they usually include a liquid crystal display panel and an input device such as a touch panel provided on the display surface side of the liquid crystal display panel. The liquid crystal display panel has such a structure that an array substrate and a counter substrate are arranged to face each other with a gap provided therebetween by spacers, and a liquid crystal layer is held between these two substrates. These two substrates are adhered to each other by their peripheral portions with a sealing member. The input device is provided on an outer side of the counter substrate. In order to enter data directly, the input surface of the touch panel is touched with, for example, a finger.

Here, when the input surface is touched with a pressure, the stress created by the touch is concentrated on the liquid crystal display panel on which the touch panel is stacked, and therefore, in some case, the thickness of the liquid crystal layer is varied (the deformation of the liquid crystal) or the liquid crystal layer is brought into contact with the array substrate and counter substrate. As a result, electric short-circuiting between the array substrate and counter substrate and a display error caused by a gap error between liquid crystal layers occur, thereby deteriorating the appearance of the displayed image. Under such circumstances, there is a demand for a liquid crystal display apparatus that exhibits an excellent stress resisting performance capability when the input surface is pressed.

Further, the liquid crystal display apparatus includes a backlight unit provided on an outer side of the array substrate. When the input surface is pressed, the light guiding plate of the backlight unit is deformed, thereby deteriorating the appearance of the displayed image.

The present invention has been contrived in consideration of the above-described circumstances and its object is to provide a liquid crystal display apparatus having an excellent stress resisting performance.

BRIEF SUMMARY OF THE INVENTION

In order to achieve the object, there is provided, according to an aspect of the present invention, a liquid crystal display apparatus comprising:

a backlight unit including a light guiding plate that includes a light emitting surface, a light source arranged to face a side edge of the light guiding plate and a back cover that covers the light guiding plate and the light source and has an opening in a region thereof that faces the light emitting surface;

a liquid crystal display panel including an array substrate provided to face the light emitting surface, a counter substrate arranged to face the array substrate with a gap therebetween and a liquid crystal layer held between the array substrate and the counter substrate;

a frame-shaped case that covers a peripheral portion of the counter substrate and a peripheral walls of the back cover; and an input device provided on the case to face the counter substrate and having an entry surface, wherein the back cover includes a plurality of projecting portions which project even the light emitting surface, face a side edge of the liquid crystal display panel, and support the input device via the case.

Additional objects and advantages of the invention will be set forth in the description which follows, and in part will be obvious from the description, or may be leaned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described in detail with reference to accompanying drawings.

Figure 1:
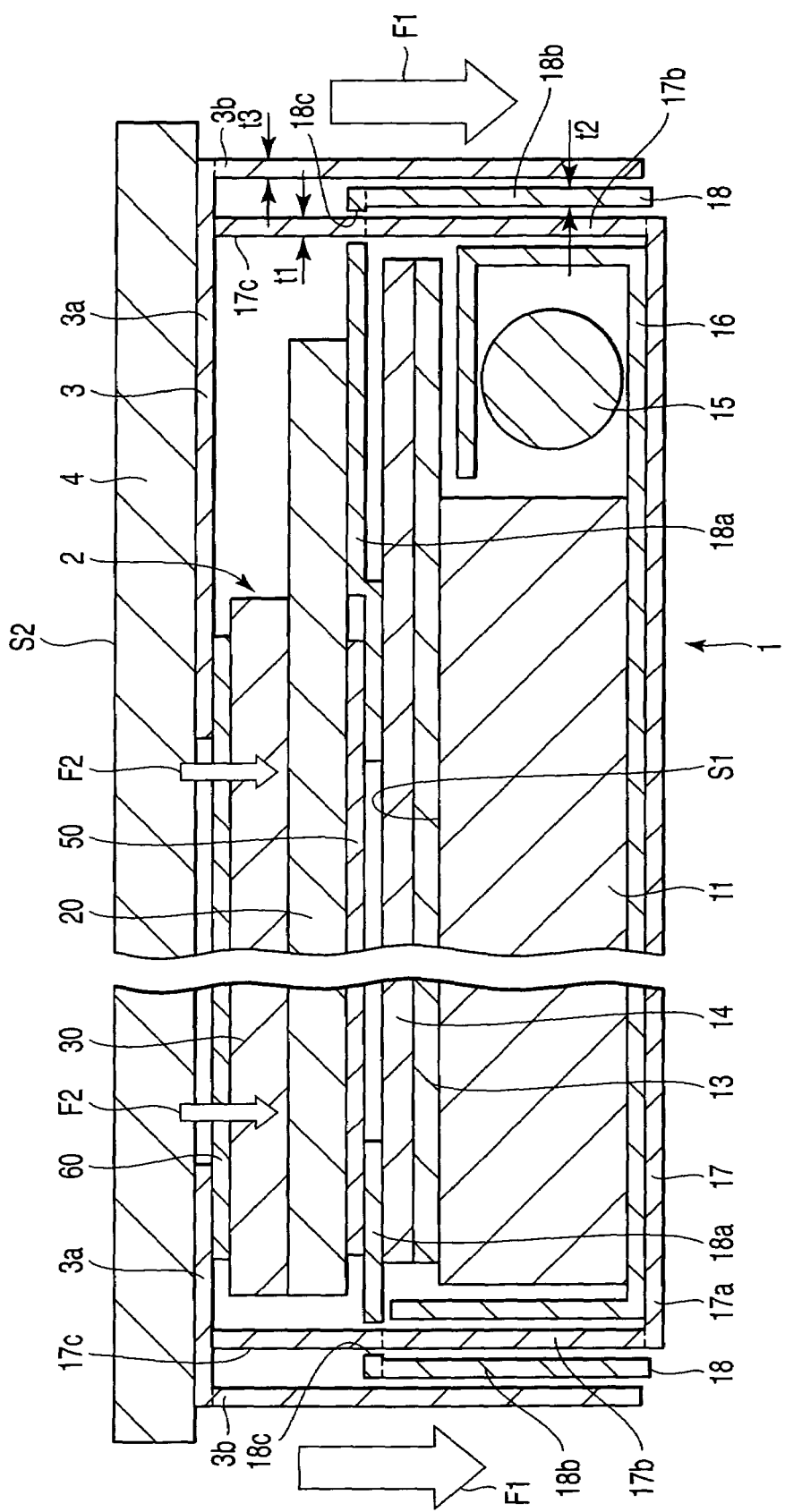
FIG. 1 is a cross sectional view of a liquid crystal display apparatus according to an embodiment of the present invention.

As shown in FIG. 1, a liquid crystal display apparatus of this embodiment includes a backlight unit 1, liquid crystal display panel 2, a case 3 and a touch panel 4 serving as an input device.

Figure 2:
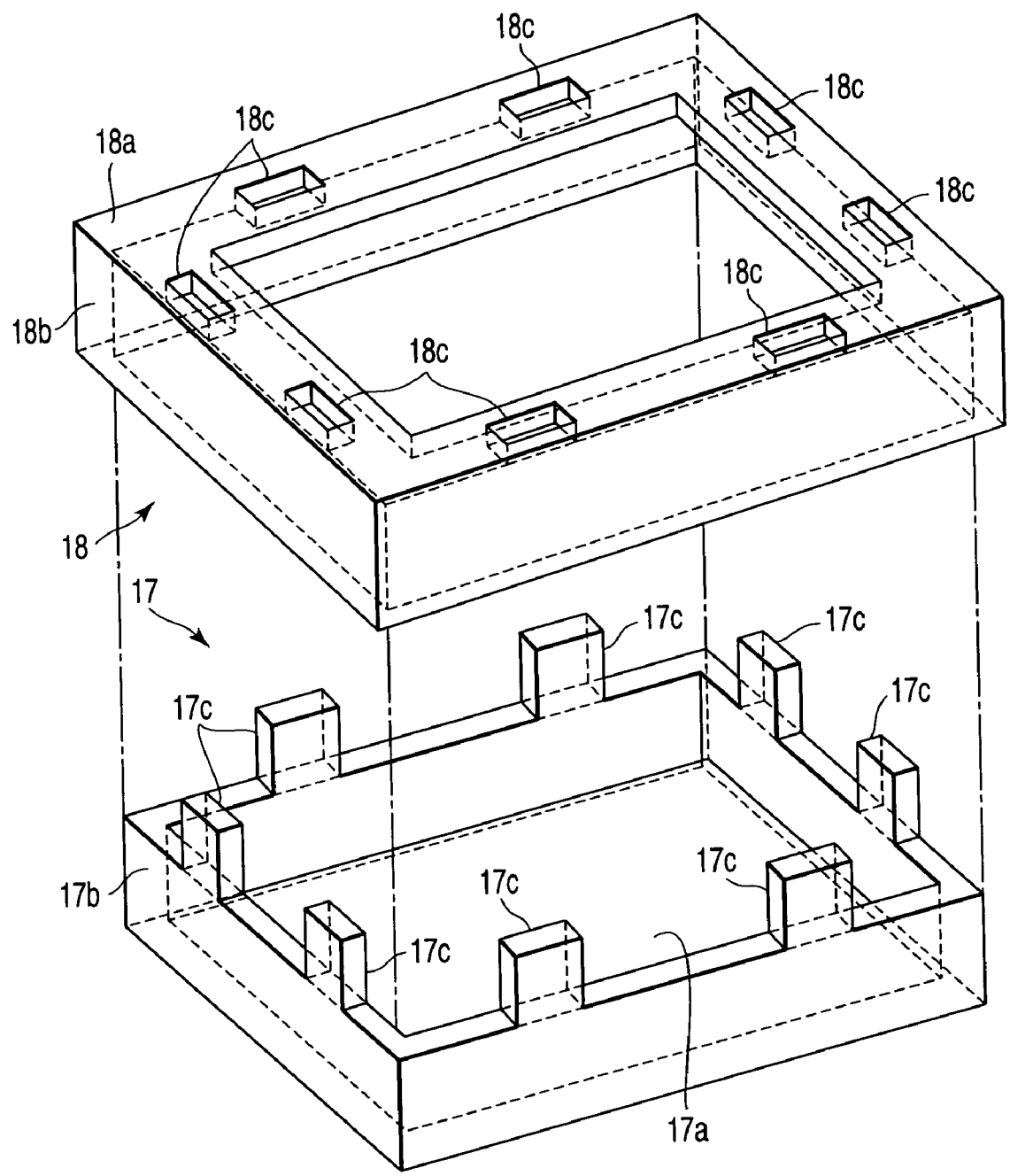
FIG. 2 is an exploded perspective diagram showing a back cover and front cover shown in FIG. 1.

As shown in FIGS. 1 and 2, the backlight unit 1 includes a light guiding plate having a light emitting surface S1, a prism sheet 13 provided on the light guiding plate 11, a diffusion film 14, a light source 15, a reflection plate 16, a back cover 17 and a front cover 18.

The light source 15 is provided on a side edge of the light guiding plate 11 to face it. The reflection plate 16 has an opening in a region thereof that faces the light emitting surface S1, and covers the light guiding plate 11 and the light source 15.

The back cover 17 has such a structure that a rectangular bottom wall 17a, rectangular frame-shaped peripheral walls 17b provided on the peripheral portion of the bottom wall and a plurality of projecting portions 17c projecting from the peripheral walls, which are all integrated as one unit. The back cover 17 has an opening in a region thereof that faces the light emitting surface S1, and covers the liquid guiding plate 11, the prism sheet 13, the diffusion film 14, the light source 15 and the reflection plate 16. Each of the projecting portions 17c projects even the light emitting surface S1. In this embodiment, the back cover 17 has two projecting portions 17c on each side of the peripheral walls 17b. These projecting portions 17c project in a direction perpendicular to the light emitting surface S1. The bottom wall 17a and the peripheral walls 17b of the back cover 17 have the same thickness, t1, which is 0.2 mm.

The front cover 18 has such a structure that a rectangular frame-shaped top wall 18a and rectangular frame-shaped peripheral walls 18b provided on the peripheral portion of the top wall, which are integrated as one unit. The front cover 18 covers the peripheral portion of the light emitting surface S1 to face the side edge of the liquid guiding plate 11, and further covers the peripheral walls 17b of the back cover 17. The front cover 18 has a plurality of openings 18c formed in the top wall 18a. In this embodiment, the front cover 18 has two openings 18c on each side of the top wall 18a. Each of the openings 18c corresponds to each respective projecting portion 17c. The projecting portions 17c are put through the respective openings 18c to extend further. The top wall 18a and the peripheral walls 18b of the front cover 18 have the same thickness, t2, which is 0.3 mm. In this embodiment, the top wall 18a overlaps with the peripheral portion of the light emitting surface S1, the peripheral portion of the prism sheet 13 and the peripheral portion of the diffusion film 14, and it is in contact with the peripheral portion of the diffusion film 14.

Figure 3:
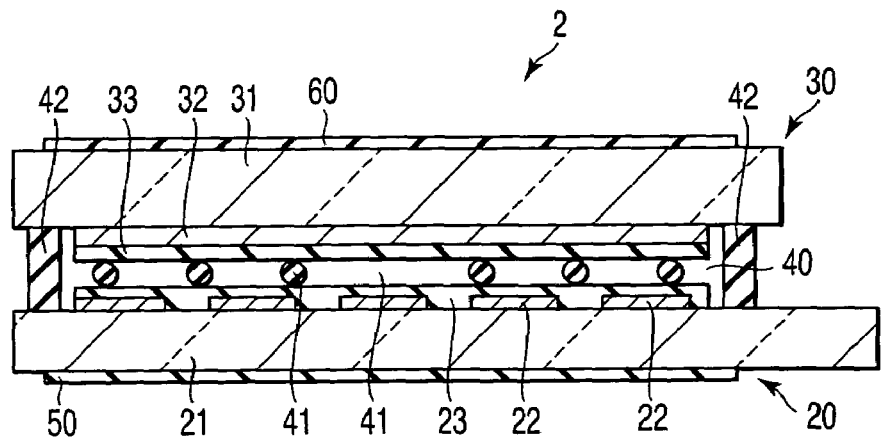
FIG. 3 is a cross sectional view of a liquid crystal display panel shown in FIG. 1.

As shown in FIGS. 1 and 3, the liquid crystal display panel 2 includes an array substrate 20 provided to face the light emitting surface S1, a counter substrate 30 and a liquid crystal layer 40.

The array substrate 20 includes a glass substrate 21, a plurality of pixel electrodes 22 formed on the glass substrate and an alignment film 23 formed on the glass substrate to include the pixel electrodes. Further, the array substrate 20 includes a plurality of types of wirings formed on the glass substrate 21, which are not shown in the figure, and a plurality of thin film transistors serving as switching elements.

The counter substrate 30 includes a glass substrate 31, a common electrode formed on the glass substrate and an alignment film 33 formed on the common electrode. The pixel electrode 22 and the common electrode 32 are each formed of a transparent conductive material such as ITO (indium tin oxide). The alignment films 23 and 33 are subjected in advance to an alignment film treatment (rubbing) process.

The array substrate 20 and the counter substrate 30 are arranged to face each other with a predetermined gap between them by means of a plurality of spacers 41. The array substrate 20 and the counter substrate 30 are bonded to each other by means of sealing members 42 set on the peripheral portions of both substrates. The liquid crystal layer 40 is held between the array substrate 20 and the counter substrate 30, and between the sealing members 42. A first polarizer 50 is provided on an outer surface of the array substrate 20, and a second polarizer 60 is provided on an outer surface of the counter substrate 30. The peripheral portions of the first polarizer 50 and the array substrate 20 overlap with the top wall 18a of the front cover 18, and the peripheral portions of the front surface of the first polarizer 50 is in contact with the top wall 18a.

Figure 4:
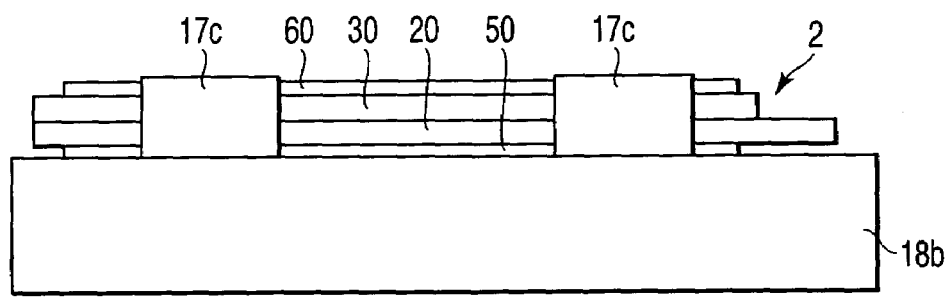
FIG. 4 is a side view of the liquid crystal display pane, back cover and front cover shown in FIG. 1.

As shown in FIGS. 1 and 4, the projecting portions 17c are set to face the side edge of the liquid crystal display panel 2. A leading end of each of the projecting portions 17a extends to a position of substantially the same level as that of the parallel plane of the outer surface of the liquid crystal display panel 2 on the side of the counter substrate 30. Here, the outer surface of the liquid crystal display panel 2 on the side of the counter substrate 30 is the outer surface of the second polarizer 60.

As shown in FIG. 1, the case 3 has such a structure that a rectangular frame-shaped top wall 3a and rectangular frame-shaped peripheral walls 3b provided on the peripheral portion of the top wall, which are all integrated as one unit. The case 3 covers the peripheral portion of the counter substrate 30 (second polarizer 60), the peripheral walls 17b and the projecting portions 17c of the back cover 17, and the peripheral walls 18b of the front cover 18. In this embodiment, the top wall 3a is in contact with the peripheral portion of the second polarizer 60. The top wall 3a and the peripheral walls 3b of the case 3 have the same thickness, t3, which is 0.2 mm.

Figure 5:
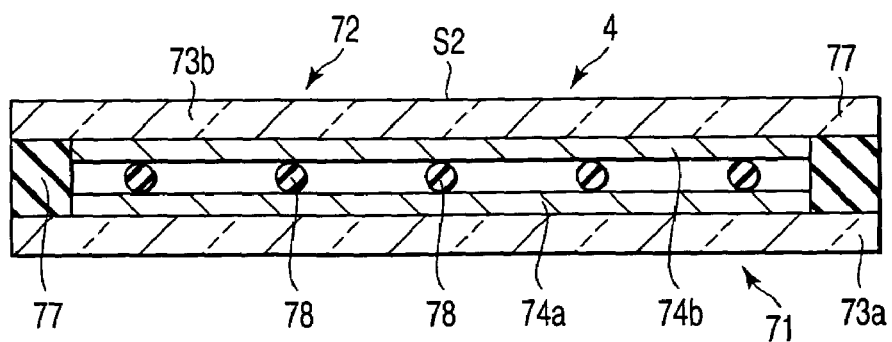
FIG. 5 is a cross sectional view of a touch panel shown in FIG. 1.

As shown in FIGS. 1 and 5, the touch panel 4 is formed as a pressure-resistive type digitizer. The touch panel 4 is arranged to face the counter substrate 30 and on the case 3. The touch panel 4 includes a first substrate 71 provided to face the counter substrate 30 and a second substrate 72 provided to face the first substrate with a predetermined gap between them. The first substrate 71 includes a first sheet 73a formed of, for example, polyester film or glass. The second substrate 72 includes a second sheet 73b formed of, for example, polyester film or glass. A first resistance layer 74a and a second resistance layer 74b, each having a rectangular shape and made of a transparent conductive material such as ITO, are formed on the first sheet 3a and the second sheet 73b. Although it is not shown in these figures, an opposing pair of sides of the first resistance layer 74a are provided with electrodes 75a and 75b, respectively. In the same manner, although it is not shown in these figures, an opposing pair of sides of the second resistance layer 74b are provided with electrodes 76a and 76b, respectively.

The first substrate 71 and the second substrate 72 are arranged such that the first resistance layer 74a and the second resistance layer 74b face to each other, and they are bonded to each other by means of sealing members 77 provided on the peripheral portions of the first sheet 73a and the second sheet 73b. The first substrate 71 and the second substrate 72 are held to have a predetermined gap between them by means of a plurality of spacers 78. The spacers 78 are made of an insulating material. The first resistance layer 74a and the electrodes 75a and 75b are maintained in an insulated state from the second resistance layer 74b and the electrodes 76a and 76b.

The touch panel 4 has an entry surface S2 on the outer surface of the second substrate 72 that are stacked on the first resistance layer 74a and the second resistance layer 74b. When entering data, the entry surface S2 is touched with some pressure to create a stress on the touch panel 4, thereby varying the width of the gap between the first substrate 71 and the second substrate 72.

Here, the projecting portions 17c face a region the case 3 that faces the touch panel 4, that is, the top wall 3a. In other words, the projecting portions 17c face the top wall 3a and are in contact therewith. In this manner, the projecting portions 17c support the top wall 3a and further the touch panel 4 as well via the top wall 3a.

In the liquid crystal display apparatus having the above-described structure, the back cover 17 includes a plurality of projecting portions 17c, which support the touch panel 4 via the top wall 3a. With this structure, when the entry surface S2 (second substrate 72) is touched with some pressure, the stress applied on the touch panel 4 is not concentrated onto the liquid crystal display panel 2, but dispersed in the case 3, as well as, in particular, these projecting portions 17c of the back cover 17.

As described above, since the stress applied to the touch panel 4 is dispersed as a stress F1 to the case 3 and the back cover 17, it is possible to control a stress F2 applied to the liquid crystal display panel 2. Thus, the deformation of the liquid crystal and the contact between the array substrate 20 and counter substrate 30 can be avoided. As a result, electric short-circuiting between the array substrate and counter substrate and a display error caused by a gap error between liquid crystal layers 40 can be prevented, thereby making it possible to maintain an excellent display quality at all times.

Further, since the tress F2 applied to the liquid crystal display panel 2 is controlled, the stress applied to the light guiding plate 11 can be suppressed as well. In this manner, the deformation (warping) of the light conducting plate 11 can be suppressed, thereby making it possible to maintain an excellent display quality at all times. Thus, it becomes possible to realize a liquid crystal display apparatus which has an excellent stress resisting performance.

Furthermore, even if the top wall 3a and the peripheral walls 3b of the case 3, the bottom wall 17a and the peripheral walls 17b of the back cover 17, and the top wall 18a and the peripheral walls 18b of the front cover 18 are formed thin as described above, it is possible to obtain a liquid crystal display apparatus with an excellent stress resisting performance. Thus, with the present invention, it becomes possible to realize a liquid crystal display apparatus which has an excellent stress resisting performance and can be formed to have a thin edge and a thin body.

The back cover 17 includes projecting portions 17c on each side of the peripheral walls 17b. With this structure, the stress F1 can be dispersed to the projecting portions 17c in a well balanced manner, thereby making it possible to improve the stress resisting performance. Further, the projecting portions 17c are designed to be put all the way through the openings 18c of the front cover 18, and therefore they can be used for alignment while assembling the back cover 17 and the front cover together as well.

With the above-described embodiment, the back cover 17 includes two projecting portions on each side of the peripheral walls 17b, and therefore the stress resisting performance can be improved even more as compared to the case where each side has only one projecting portion. Further, with the structure in which there are two projecting portions 17c on each side, the projecting portions can be used for alignment between the back cover 17 and the front cover 18 when they are assembled together. Further, with this structure, it is possible to prevent rattling of the back cover and front cover, which is caused by the bonding error. It should be noted that the rattling suppressing effect described above is prominent when the back cover 17 includes two or more projecting portions on each side of the peripheral walls 17b. Note that it is only natural that the front cover 18 has the corresponding number of openings 18c to the number of the projecting portions 17c.

Lastly, the present invention is not limited to the embodiment described above, but it can be remodeled into various versions as long as the essence of the invention remains. For example, it suffices if the back cover 17 includes at least one projecting portion 17c on each side of the peripheral walls 17b. The shape and projecting direction of the projecting portion 17c are not limited to those of the embodiment described above. In the case where the thickness of the bottom wall 17a and the peripheral walls 17b of the back cover 17 is in a range of 0.2 mm to 0.3 mm, the thickness of the top wall 18a and the peripheral walls 18b of the front cover 18 is in a range of 0.2 mm to 0.3 mm, and the thickness of the top wall 3a and the peripheral walls 3b of the case 3 is in a range of 0.2 mm to 0.3 mm, it is possible to obtain a liquid crystal display apparatus that can realize a thinned edges of the members of the displays and a thinned display panel itself, and an excellent stress resisting performance.

What is claimed is:

1. A liquid crystal display apparatus, comprising:
    a backlight unit including a light guiding plate that includes a light emitting surface, a light source arranged to face a side edge of the light guiding plate, a back cover that covers the light guiding plate and the light source and has an opening in a region thereof that faces the light emitting surface, and a frame-shaped front cover that covers a peripheral portion of the light emitting surface and faces the side edge of the light guiding plate, and further covers peripheral walls of the back cover;
    a liquid crystal display panel including an array substrate provided to face the light emitting surface, a counter substrate arranged to face the array substrate with a gap therebetween and a liquid crystal layer held between the array substrate and the counter substrate;
    a frame-shaped case that covers a peripheral portion of the counter substrate and the peripheral walls of the back cover; and
    an input device provided on the case to face the counter substrate and having an entry surface,
    wherein the back cover includes a plurality of projecting portions which project through openings formed in the frame-shaped front cover and a side edge of the liquid crystal display panel in a direction perpendicular to the light emitting surface, contact a back of the case that faces the input device, and support the input device via the case.

2. The liquid crystal display apparatus according to claim 1, wherein the back cover has a rectangular shape, and the projecting portions include at least one projecting portion on each side of the back cover.

3. The liquid crystal display apparatus according to claim 1, wherein the back cover has a rectangular shape, and the projecting portions include two or more projecting portions on each side of the back cover.

4. The liquid crystal display apparatus according to claim 1, wherein a thickness of the back cover, a thickness of the front cover, and a thickness of the case are each in a range of 0.2 mm to 0.3 mm.

* * * * *